Oct. 18, 1949.    A. DIAMOND    2,485,087
ILLUMINATED FISHING FLOAT
Filed Sept. 16, 1948
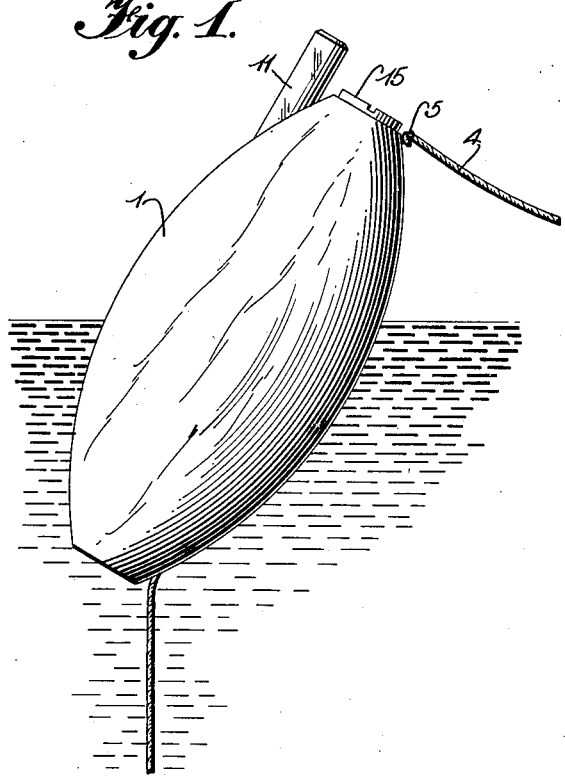
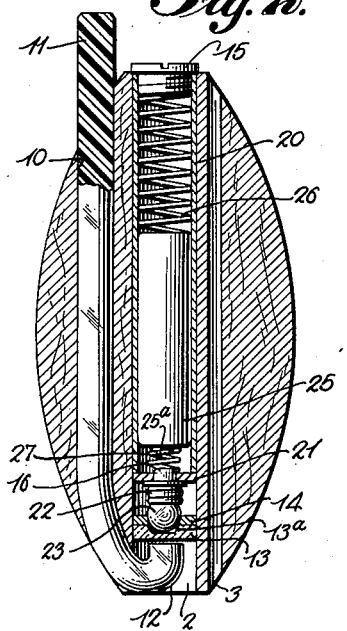
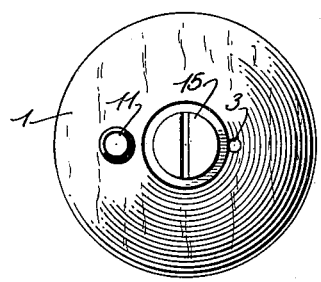
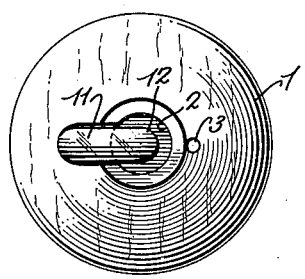
INVENTOR.
*Abe Diamond*
BY
*Sidney W. Russell*
ATTORNEY Patented Oct. 18, 1949

2,485,087

UNITED STATES PATENT OFFICE 2,485,087

ILLUMINATED FISHING FLOAT

Abe Diamond, Jacksonville, Fla.

Application September 16, 1948, Serial No. 49,620

5 Claims. (Cl. 43—49)

The present invention relates to an improved fishing float or bob adapted to provide means for illuminating both the bait used in connection with the bob as well as to prominently display from the surface of the water the location of the bob.

Certain types of illuminated floats have been devised in the past but almost uniformly these involve complex and intricate parts, are expensive to produce and do not attain the useful results accomplished by my invention. It is well known that in ordinary sport fishing it is often desirable when fishing at night to utilize a float having some form of lighting media which is designed to attract the fish by shining downwardly into the water. It is also desirable to provide some means whereby the bob or float which is, of course, proximately attached to the bait can be easily located. To accomplish these purposes it would ordinarily be necessary to provide a separate and unitary light producing means at each end of the float and this obviously necessitates a duplication and multiplicity of parts. However, by my invention the bob is illuminated at both ends, yet it is necessary to provide only one common light source or light producing media. The entire unit in the form which I will hereinafter describe is efficient and reliable in performance and is well adapted to the purposes which I have outlined in the foregoing.

Accordingly, the primary object of my invention is to provide a float having means for lighting the opposite ends thereof but at the same time requiring only one light source, or one light producing means to accomplish this purpose.

An additional object of the invention is the provision of a lighted float which contains a watertight and simple battery unit that is, due to the compact arrangement of parts, practically indestructible from ordinary usage.

A further object is to provide a lighted float or bob enabling the light producing means and mechanism related thereto to be removed and replaced with exceptional ease and without the disassembly of a multiplicity of parts.

My invention also provides a float that represents the extreme in simplicity and durability of operation and is readily adaptable, because of these characteristics, to mass production.

Other objects and advantages reside in the details of construction and operation as more fully hereinafter described and claimed, reference being had to the accompanying drawings forming part hereof, wherein like designations refer to like parts throughout, and in which:

Figure 1 is a side elevational view of the invention;

Figure 2 is a cross-section of the invention illustrated in Figure 1;

Figure 3 is a top view of the invention illustrated in Figure 2, and

Figure 4 is a bottom view of the invention illustrated in Figure 2.

Briefly, the preferred embodiment of my invention comprises a fishing float of an approximately ellipsoidal shape, flattened at each end and having a hollowed inner chamber fitted with a light producing mechanism such as the ordinary small flash light battery and the usual light bulb. The float is also equipped with a member or rod comprised of synthetic resin, plastic, or some similar composition having the characteristic of being able to bend and convey light rays. The rod is so located that it receives light at one end of the float and transmits the same through the body thereof to emanate at the opposite end. Provision is also made to waterproof the bob and light compartment and by construction of the same as a unit, permit easy replacement of the dry cell by the user.

Referring now in more detail to the drawings, it will be seen that the numeral 1 designates a float having a generally oval configuration flattened at each extremity and which may be made of any appropriate material such as various types of wood, cork, plastic compositions, etc. I have found balsa wood to be extremely suitable for this purpose. There is a passageway 2 which extends throughout the longitudinal axis of the float as illustrated in Figure 2 and adjacent to the same a smaller longitudinal aperture 3. The latter is designed to accommodate the usual fishing line 4 which can be knotted as at 5 to prevent the line from running free through the passageway when the device is in use. The line as illustrated in Figure 1 is generally provided with a sinker 6 and a common form of hook 7.

The float is also furnished with a third channel or passageway 10 also extending throughout the length thereof. This passageway 10 is designed to accommodate a light conveying member or rod 11 which extends at its upper end a short distance past the adjacent end of the float. The opposite end of the rod 11 is curved as indicated at 12, into a U- or hook-shaped turn, such that this end of the said rod extends a short distance into the passageway 2. It is necessary that the rod 11 be made of some one of the well-known forms of plastic material which have the characteristics of being able to transmit and bend light waves. Such material is common to the trade and one example thereof is manufactured under the trade-mark "Lucite" which is a methacrylate resin having this light bending propensity and having, to the eye, a translucent appearance.

Immediately adjacent the lower or bent end 12 of the rod 11 is positioned a transparent member 13 of glass or any other suitable material, which may be so closely fitted within the chamber 2 as to waterproof that end of the chamber. This transparent member 13 may be slightly dished upon its inner surface and at the center as indicated at 13a so as to accommodate in close relationship an ordinary small light bulb. Waterproofing on this end of the chamber is further accomplished, if desirable, by the provision of a rubber gasket 14 which is placed adjacent member 13 and closely presses against the walls of the chamber. The gasket 14 is perforated, as shown, with an aperture of such size as to permit egress of the light rays from the bulb, yet will bear upon the outer surface of the latter and consequently act as a form of shock absorber or protective mount for the said bulb. At the opposite end of the chamber I have utilized threaded nut or screw cap 15, obviously removable, so that the light producing means is made readily accessible. If desirable a suitable gasket may be inserted between the shoulder of cap 15 and the float 1 or casing 20 to additionally assure waterproofing of the battery compartment at this end of the float.

The light producing mechanism is mounted within a suitable battery housing which I have indicated at 20 and which extends substantially throughout the length of chamber 2. Inasmuch as this housing is designed to accommodate any suitable type of battery, such as a flashlight battery 25, it is generally desirable to fabricate the same of a non-conductive material. The battery 25 is maintained in position by two springs 26 and 27 mounted upon each side thereof, spring 26 abutting the inner surface of nut 15 and one end of said battery, and the shorter spring 27 abutting the ordinary light bulb contact 16, and the battery contact 25a as indicated in Figure 2. In this position each spring, besides performing the function of conductor to the said bulb, is also a shock mount for the battery and related apparatus. The lower end of the battery housing 20 may be closed off by an additional watertight end plate 21 to which is affixed a common type of bulb fitting 22, the latter accommodating a small light bulb 23 of the flashlight type.

It will be apparent, by reference to Figure 2, that the battery casing 20 and the various parts integral therewith, can be fabricated to provide a complete and self-contained unit. Although removal of the casing 20 is not necessary for battery replacement, it is desirable that it be removably positioned. To this end, casing 20 can be made of such size that when inserted in chamber 2 it will be retained in position by friction alone. Similarly, the entire unit can then be removed merely by lifting nut 15 without disengaging it from the chamber 20, after which any of the light producing mechanism is readily available for correction or replacement. It is obvious that many other means within the skill of the art could be devised to enable ease of removal of the said chamber 20. It is conceivable that other alternatives may be used to mount the compartment 20 in chamber 2 of the float, such as a snap button arrangement, well known in the art, which could be easily designed to accomplish this purpose.

It will be noted that in the construction described, light at the lower end of the float is derived substantially through transparent member 13, although a certain portion of light will also be absorbed and diffused at the lower end of said float by the U-shaped end 12 of member 11. I consider other equivalent structures within my invention.

From the foregoing it is apparent that the entire arrangement of parts is readily adaptable to removal and replacement of the battery and all that is necessary is to unscrew cap 15, remove the spring 26 and drop the battery into the hand where it can be replaced by the obvious procedure. It is obvious that a suitable switch could easily be fixed to the float so that the light could be turned on and off without the necessity of removal of the battery. However, in general usage, where the float is continuously used over a considerable period of time, it will generally be found necessary to replace the battery. Although I have not shown an interconnection between the upper end of the battery and the bulb housing 22 whereby a complete electric circuit is obtained, this arrangement would fall within the contemplation of the art and any combination of parts such as is generally employed in the ordinary flashlight would indicate the means for accomplishing this end. More particularly, the circuit arrangement described in the patent to Klinitski, No. 2,236,215, is easily adaptable to my device for this purpose, and will perform the desired function.

From the foregoing the mode of operation of the float or bob is apparent. After affixing the line, sinker and hook as shown in Figure 1, a battery is inserted as stated in the foregoing, the cap 15 replaced and the unit is ready for use. The obvious advantage of this particular arrangement of parts is that only one light source is needed. In other words, only one light and battery are necessary to enable the bob to be lighted at its opposite extremities. The light after being emitted through the transparent member 13 will shine downwardly and through transparent member 13, and additionally impinge upon the lower end 12 of the light conveying rod 11. By reason of the peculiar characteristics of this type of plastic material, the light waves are caused to bend around the lower U-turn or hook portion of the rod 11 and are transmitted throughout its length to be again emitted through the portion of the rod extending from the upper end of the float.

This arrangement has inherent and obvious advantages over constructions of the prior art, wherein in order to provide a float with lights at the opposite ends thereof, it has been necessary to accommodate two separate lighting units, each comprising individual and separate batteries as well as separate bulbs and related additional parts. By the present arrangement of my invention the additional elements necessitated by previous devices I have referred to are obviated and a simple and compact structure more advantageously accomplishes the desired result.

While I have indicated the preferred embodiments of my invention of which I am now aware, it is apparent that my invention is by no means limited to the exact forms illustrated or the uses indicated, but that many variations may be made in the particular structure used and the purpose for which it is employed without departing from the scope thereof as set forth in the appended claims.

What I claim as new is:

1. In a fishing device, a float provided with a plurality of passageways arranged longitudinally thereof, one of said passageways having mounted therein an illuminating means comprising a battery operatively associated with a light bulb, one of said passageways having a light conveying member comprising an elongated body of light transmitting material, one end of which receives light from said bulb and emits light at one end of said float, said member conveying said light therethrough to emit light at the other end of said float, and one of said passageways being adapted to interconnect said float with a fishing line.

2. In a fishing device, a float having a chamber, a transparent closure at one end of said chamber and a removable closure at the other end of said chamber, light producing means in said chamber adapted to emit light through said transparent closure and out one end of said float, and means to convey said light to the other end of said float comprising an elongated body of light transmitting material; one end of said elongated body opposing said transparent closure, and said elongated body having its opposite end emerging at the opposite end of said float, whereby said float may be lighted at both ends.

3. In a fishing device, a float having a chamber, a removable housing in said chamber extending substantially to each end of said float and having a transparent closure at one end thereof, light producing means in said chamber comprising a battery resiliently mounted in said chamber, a bulb operatively associated with said battery and mounted adjacent said one end of said chamber, a resilient support at the said one end of said chamber, said bulb being positioned against said resilient support to prevent shock thereto, and means to transmit light to each end of said float comprising a light conveying element with one end positioned adjacent said transparent closure, the opposite end of said element being positioned at the opposite end of said float.

4. A fishing device comprising a float having a passage for a line and a longitudinal chamber provided with a removable housing extending substantially to each end of said float, one end of said housing having a transparent portion, means to produce a light in said chamber comprising a bulb and a battery operatively associated therewith, said housing being mounted for waterproof retention in said chamber, means to resiliently support said bulb comprising a resilient element engaging the outer periphery of said bulb, and means to transmit light to each end of said float comprising an elongated bar of light transmitting material, one end of which is positioned opposite said bulb at one end of said float, the remaining portion thereof having a bent and a straight portion extending through said float adjacent said chamber, the opposite end of said bar protruding substantially from the opposite end of said float.

5. A float having means for receiving a fishing line, a chamber, and a longitudinal bore, illuminating means within the chamber, and an elongated bar of light transmitting material extending through said bore and having one end thereof adjacent to the illuminating means and the opposite end thereof freely exposed.

ABE DIAMOND.

REFERENCES CITED

The following references are of record in the file of this patent:

UNITED STATES PATENTS

| Number | Name | Date |
|---|---|---|
| 2,110,596 | Gaede | Mar. 8, 1938 |
| 2,193,404 | Goertzen | Mar. 12, 1940 |
| 2,227,861 | Petrone | Jan. 7, 1941 |
| 2,236,215 | Klinitski | Mar. 25, 1941 |
| 2,272,802 | High et al. | Feb. 10, 1942 |
| 2,316,589 | Iwanowicz | Apr. 13, 1943 |